United States Patent
Chen et al.

(10) Patent No.: US 11,216,023 B2
(45) Date of Patent: Jan. 4, 2022

(54) CLOCK TICK INTERRUPT CONFIGURATION METHOD AND APPARATUS

(71) Applicant: Alibaba Group Holding Limited, Grand Cayman (KY)

(72) Inventors: Lingjun Chen, Hangzhou (CN); Bin Wang, Hangzhou (CN); Liangliang Zhu, Hangzhou (CN); Xu Zeng, Hangzhou (CN); Zilong Liu, Hangzhou (CN); Junjie Cai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 212 days.

(21) Appl. No.: 16/726,611

(22) Filed: Dec. 24, 2019

(65) Prior Publication Data

US 2020/0133328 A1    Apr. 30, 2020

Related U.S. Application Data

(63) Continuation of application No. PCT/CN2018/092144, filed on Jun. 21, 2018.

(30) Foreign Application Priority Data

Jun. 27, 2017  (CN) .......................... 201710500927.5

(51) Int. Cl.
  *G06F 1/08*   (2006.01)
  *G06F 1/3296*  (2019.01)
  (Continued)

(52) U.S. Cl.
  CPC ................ *G06F 1/08* (2013.01); *G06F 1/329* (2013.01); *G06F 1/3296* (2013.01);
  (Continued)

(58) Field of Classification Search
  CPC . G06F 1/08; G06F 1/12; G06F 1/3206; G06F 1/3228; G06F 1/329; G06F 1/3296; G06F 9/4825
  See application file for complete search history.

(56) References Cited

U.S. PATENT DOCUMENTS

| 5,493,684 | A | 2/1996 | Gephardt et al. |
| 5,511,203 | A | 4/1996 | Wisor et al. |

(Continued)

FOREIGN PATENT DOCUMENTS

| CN | 101840353 A | 9/2010 |
| CN | 104679583 A | 6/2015 |

(Continued)

OTHER PUBLICATIONS

Translation of Chinese International Search Report dated Sep. 18, 2018, from corresponding PCT Application No. PCT/CN2018/092144, 2 pages.

(Continued)

*Primary Examiner* — Terrell S Johnson
(74) *Attorney, Agent, or Firm* — Lee & Hayes, P.C.

(57) ABSTRACT

A method and an apparatus for setting a time for a tick interrupt are disclosed. The method includes performing a compensation for a system time when a tick interrupt is executed; setting a time of a next tick interrupt according to a timeout task and a compensated system time if the timeout task exists when the tick interrupt is executed; and when a system enters into a low power mode after the tick interrupt is executed, correcting the time of the next tick interrupt according to the timeout task that is updated when the low power mode is entered. The present disclosure can decouple logic relationships between tick interrupts and Idle tasks, thereby reduces the number of division operations that involve rounding, reduces such accumulated error associ- (Continued)

ated with compensation time, and improves the accuracy of the system time, as compared to the existing technologies.

19 Claims, 16 Drawing Sheets

(51) Int. Cl.
*G06F 9/48* (2006.01)
*G06F 1/329* (2019.01)
*G06F 1/12* (2006.01)
*G06F 1/3228* (2019.01)
*G06F 1/3206* (2019.01)

(52) U.S. Cl.
CPC .............. *G06F 9/4825* (2013.01); *G06F 1/12* (2013.01); *G06F 1/3206* (2013.01); *G06F 1/3228* (2013.01); *Y02D 30/50* (2020.08)

(56) References Cited

U.S. PATENT DOCUMENTS

| | | |
|---|---|---|
| 7,730,248 B2 | 6/2010 | Goss et al. |
| 8,020,025 B2 | 9/2011 | Hyatt |
| 8,055,828 B2 | 11/2011 | Conti et al. |
| 8,112,647 B2 | 2/2012 | Branover et al. |
| 8,134,942 B2 | 3/2012 | Messinger et al. |
| 8,156,362 B2 | 4/2012 | Branover et al. |
| 8,181,047 B2 | 5/2012 | Lee |
| 8,886,981 B1 | 11/2014 | Baumann et al. |
| 8,959,270 B2 | 2/2015 | de Cesare et al. |
| 9,348,359 B2* | 5/2016 | Bhargava .............. G06F 9/4401 |
| 9,405,347 B2 | 8/2016 | Wang et al. |
| 2016/0077575 A1 | 3/2016 | Paul et al. |
| 2017/0262393 A1* | 9/2017 | Takaki .................. G06F 1/3287 |

FOREIGN PATENT DOCUMENTS

| | | |
|---|---|---|
| CN | 104834347 A | 8/2015 |
| CN | 105807892 A | 7/2016 |

OTHER PUBLICATIONS

Translation of Chinese Office Action dated Oct. 23, 2019, from corresponding CN Patent Application No. 2017105009275, 9 pages.
Translation of Chinese Office Action dated Apr. 14, 2020, from corresponding CN Patent Application No. 2017105009275, 10 pages.
Translation of Chinese Search Report datedOct. 16, 2019, from corresponding CN Patent Application No. 2017105009275, 1 page.
Translation of Chinese Written Opinion dated Sep. 18, 2018, from corresponding PCT Application No. PCT/CN2018/092144, 4 pages.
Liu, Ji, "Ticless The Study of Tickless Technology and Implementation in Embeded System," CNKI Master's Theses Full-text Database, Nov. 30, 2009 (Nov. 30, 2009), pp. 21-49.

* cited by examiner

CLOCK TICK INTERRUPT CONFIGURATION METHOD AND APPARATUS

CROSS REFERENCE TO RELATED PATENT APPLICATIONS

This application claims priority to and is a continuation of PCT Patent Application No. PCT/CN2018/092144 filed on 21 Jun. 2018, and is related to and claims priority to Chinese Application No. 201710500927.5, filed on 27 Jun. 2017 and entitled "Clock Tick Interrupt Configuration Method and Apparatus," which are hereby incorporated by reference in their entirety.

TECHNICAL FIELD

The present disclosure relates to the technical field of computers, and particularly to clock tick interrupt configuration methods and apparatuses.

BACKGROUND

With the development of technology, an increasing amount of attention is being paid to low power consumption requirements of RTOS (Real Time Operating System) systems. At first, low-power design ideas thereof are as follows: 1. Enter into a low-power mode when an Idle task is running; 2. Wake up an MCU (Microprogrammed Control Unit, an essence thereof being a single-chip device, which refers to integrating a CPU, a RAM, a ROM, a timing counter, and various types of I/O interfaces of a computer onto a single chip to form a chip-level computer) through a tick interrupt or an external event under an appropriate condition. An Idle task is a task having the lowest priority level in a system, and is executed when no other tasks are present. A tick interrupt is a time slice benchmark of the system time.

FIG. 1 is a schematic diagram of task scheduling of the above system. In FIG. 1, the vertical axis is the task axis, and the horizontal axis is the time axis, T1, T2, T3, and T4 are tick interrupts of four equidistant time slices. As can be seen from FIG. 1, four idle periods, Idle1, Idle2, Idle3, and Idle4, exist among these five task schedules of TaskA, TaskB, TaskC, TaskD, and TaskE. In order to reduce power consumption, an Idle task is in a low power mode during operation, and tick interrupts are generated at T1 and T4 positions during operations of Idle1 and Idle4 to awaken the MCU, which enters into a low power mode after waking up. Therefore, as can be seen from the second point, each time when a clock source counter of a RTOS system generates a tick interrupt, the MCU will also wake up from the low power mode, and then enters into the low power mode again. Awakening from the low power mode makes the MCU being unable to enter into a deep sleep, and this is also unreasonable for low power consumption design.

In order to avoid the above situation, in existing technologies, the time of a next tick interrupt is dynamically calculated and set in an Idle task. An execution process in the Idle task is: 1. System preemption is turned off; 2. The time for a next tick interrupt is calculated and set based on the current system time; 3. A CPU (Central Processing Unit) sleeps, so that a MCU enters into a low power mode; 4. The CPU makes compensation for the system time after being woken up by any interrupt other than a tick interrupt; 5. The system preemption is turned on. After the system preemption is turned on, tasks with higher priority levels can be executed.

In the above-mentioned scheme of dynamically calculating and setting the time of a next tick interrupt in an Idle task in the existing technologies: any interrupt of a system other than a tick interrupt will wake up a MCU, and an action of time compensation is then performed. Such action of time compensation involves a division operation, which involves rounding. If the system is interrupted frequently, an error associated with such time compensation will be very large, which increases the inaccuracy of the system time.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides methods, apparatuses, devices, and storage media for setting a clock tick interrupt.

The present disclosure provides the following solutions.

Embodiments of the present disclosure provide a method for setting a time for a tick interrupt, which includes: performing a compensation for a system time when a tick interrupt is executed; setting a time of a next tick interrupt according to a timeout task and a compensated system time if the timeout task exists when the tick interrupt is executed; and when a system enters into a low power mode after the tick interrupt is executed, correcting the time of the next tick interrupt according to the timeout task that is updated when the low power mode is entered.

The embodiments of the present disclosure provide a method for setting a time for a tick interrupt, which includes performing a compensation for a system time when a tick interrupt is executed; and setting a time for a next tick interrupt according to a timeout task and a compensated system time is the timeout task exists when the tick interrupt is executed.

Correspondingly, the embodiments of the present disclosure provide an apparatus for setting a time for a tick interrupt, which includes: a compensation module configured to perform a compensation for a system time when a tick interrupt is executed; a first interrupt setting module configured to set a time of a next tick interrupt according to a timeout task and a compensated system time if the timeout task exists when the tick interrupt is executed; and an interrupt correction module configured to correct, when a system enters into a low power mode after the tick interrupt is executed, the time of the next tick interrupt according to the timeout task that is updated when the low power mode is entered.

Correspondingly, the embodiments of the present disclosure provide an apparatus for setting a time for a tick interrupt, which includes: a compensation module configured to perform a compensation for a system time when a tick interrupt is executed; and a first interrupt setting module configured to set a time for a next tick interrupt according to a timeout task and a compensated system time is the timeout task exists when the tick interrupt is executed.

The embodiments of the present disclosure further provide a device, which includes: one or more processors; and in one or more computer readable media storing instructions that, when executed by the one or more processors, cause the device to perform the aforementioned methods for setting a time for a tick interrupt.

The embodiments of the present disclosure also provide one or more computer readable media storing instructions that, when executed by one or more processors, cause a device to perform the aforementioned methods for setting a time for a tick interrupt.

According to specific embodiments provided by the present disclosure, the present disclosure discloses the following technical effects:

First, the entire solution is configured for tick interrupts of a system. Therefore, the present disclosure decouples the tick interrupts of the system from Idle tasks. As such, any wake-ups caused by interrupts other than tick interrupts will not trigger such action of time compensation.

Second, relative to the solution of setting a time for a next tick interrupt in an Idle task, the Idle task can only control a tick interrupt in a current task cycle. For example, Idle1 in FIG. 1 can only control such tick interrupt of T1 at a start moment of Task B, and cannot control tick interrupts in the entire system globally. The present disclosure for tick interrupts is a system-level dynamic tick solution, which control tick interrupts of the entire system.

In summary, the above solution of the present disclosure proposes concepts of dynamic tick at a system level, which dynamically sets a tick interrupt of a system at the system level, decouples the tick interrupt from an Idle task, and does not dynamically calculate a time for a next tick interrupt in the Idle task. Therefore, the system's preemption is not turned off, and frequent interruptions form interrupts other than tick interrupts do not occur. As such, there is no process of system compensation every time when being interrupted and awake, thus reducing the number of times of performing compensation for the system time, which thereby reduces the number of division operations that involve rounding, reduces such accumulated error associated with compensation time, and improves the accuracy of the system time, as compared to the existing technologies.

Apparently, any products implementing the present disclosure do not necessarily require all of the above advantages to be accomplished at the same time.

BRIEF DESCRIPTION OF THE DRAWINGS

In order to more clearly illustrate the embodiments of the technical solutions of the present disclosure or the existing technologies, drawings to be used with the embodiments are briefly described herein. Apparently, the described drawings merely represent some embodiments of the present disclosure. One skilled in the art can obtain other drawings according to these drawings without making any creative effort.

DETAILED DESCRIPTION

Figure 1:
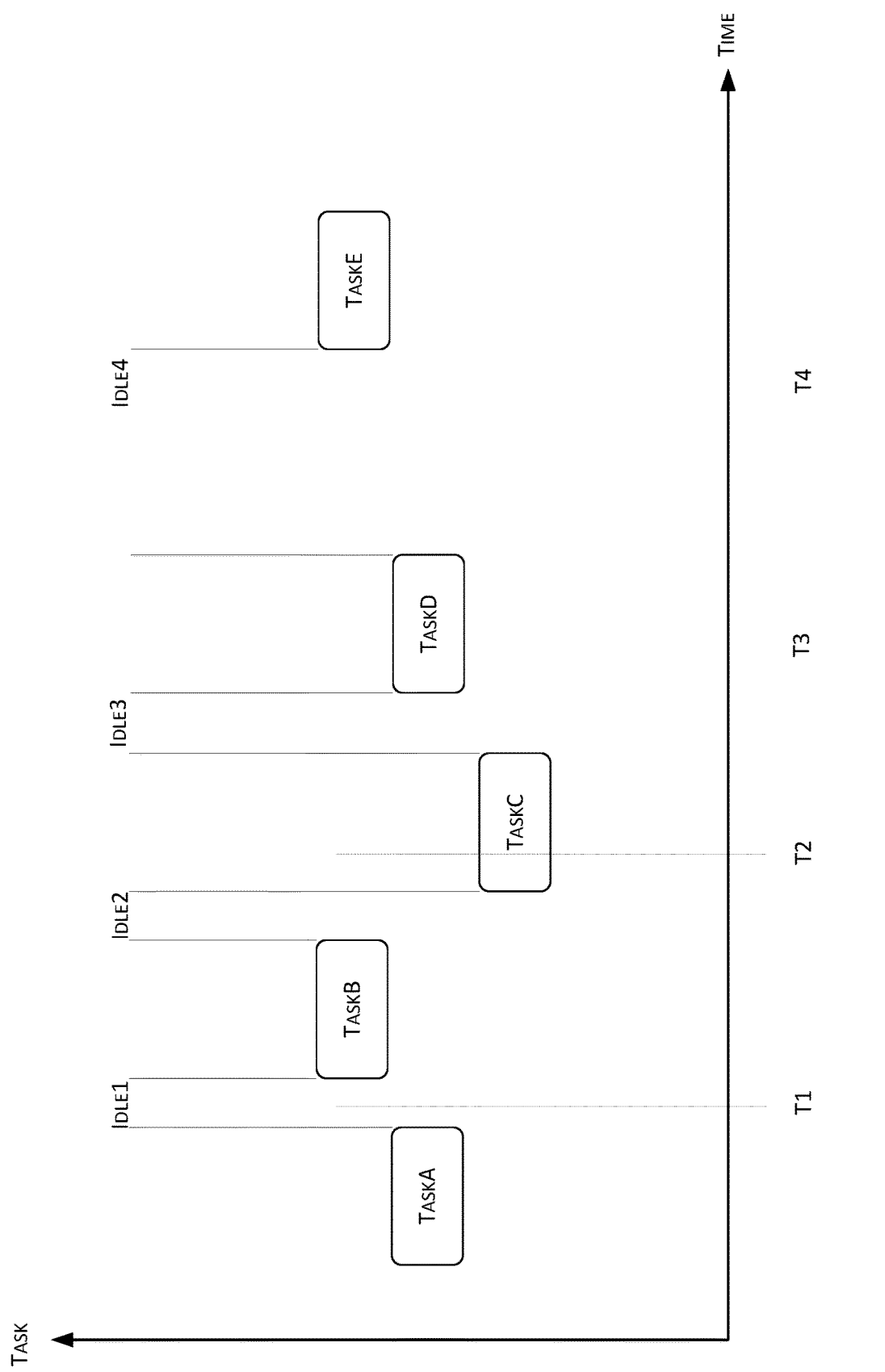
FIG. 1 shows a diagram illustrating an example of tick interrupt in the existing technologies.

The technical solutions shown in the exemplary implementations are clearly and completely described hereinafter with reference to the drawings. Apparently, the described embodiments represent only a part and not all of the embodiments of the present disclosure. All other embodiments obtained by one of ordinary skill in the art based on the embodiments of the present disclosure fall within the scope of protection of the present disclosure.

For a system, such as MCU, the number of ticks directly corresponds to a system time, and the system time is calculated by a tick counter. For example, if a tick is 10 milliseconds, then 1 second is 100 ticks. Any subsequent computations performed by the system needs to use the system time as a basis. Since the system may be in a sleep state, its tick counter is in a stop counting state during a sleeping process. Therefore, it is necessary to perform a compensation for the system time after a tick interrupt, to make a compensation to a counter value that the tick counter needs to have reached during a process from the above sleeping to being awakened.

The embodiments of the present disclosure are aimed at avoiding such action of time compensation that is performed for a system once a CPU is awakened up due to interrupts other than a tick interrupt of the system interrupting the sleep of a CPU and causing the system to leave a low power mode in the solution of setting a next tick interrupt in an Idle task in the existing technologies. Since the action of time compensation involves a division operation and also involves rounding. For example, if a clock frequency is 30 Mhz/s (megahertz per second), for counting of a clock cycle, converting timer_counter to a number of ticks involves a division operation. If timer_counter is 111111111, a conversion thereof into a number of ticks is $111111111*(\frac{1}{30}M)=5.55\ldots$, and 6 ticks are obtained by rounding off the number. If the number of times that the CPU is awaken in an Idle task is too large, an error associated with time compensation will be very large, resulting in inaccuracy of the system time, causing uncertainty in time, and affecting operations of the system.

Therefore, the present disclosure can perform the following actions in each execution of a tick interrupt of a system: performing a compensation for a system time, and setting a time for a next tick interrupt based on a compensated system time and timeout tasks having a timeout requirement when the timeout tasks exist in the system. Since a new timeout task having a timeout requirement may appear during a process of awakening by the system's timeout task, and in order to comply with design ideas of a tick interrupt (i.e., the tick interrupt is intended for a normal execution of a task), a situation in which a CPU sleeps and a timeout period of a task has past may occur if a sleep is directly entered after the tick interrupt without modifying a time for a next tick interrupt. For example, a timeout period of a certain new timeout task A is 1 second, but a tick time that is set in a previous tick interrupt is 2 second. In this case, the timeout task A cannot be executed normally. In order to avoid this type of situation, it is necessary to set up an operation of correcting a time for a next tick interrupt when the system enters a low power mode after an execution of a tick interrupt based on a timeout task that is updated when the low power mode is entered. This therefore decouples a tick interrupt of the system from an Idle task, dynamically setting the tick interrupt of the system at a system level, which controls tick interrupts of the entire system, avoids time compensation caused by interrupts other than the tick interrupts, thereby reducing the number of times of time compensation, reducing an error associated with time compensation, and improving the accuracy of a system time.

Terminologies that are used in implementations are described.

Clock cycle: a clock cycle determines an operating frequency of a CPU, such as 30 Mhz/s as described above, with 1 clock cycle as ⅓₀M.

Tick: a tick, i.e., a clock tick, with N clock cycles as a tick.

Timer_counter: a clock source counter, which counts clock cycles, having a register address range as one cycle, for example, 32 bits from 0 to 0xffffffff as one cycle.

Tick counter: record the number of ticks, with the number of ticks corresponding to a system time. For example, if one tick is 10 milliseconds, then 1 second corresponds to 100 ticks, which can therefore correspond to the system time.

Tick interrupt: Tick interrupt, a CPU is awaken after a tick interrupt, causing a system to leave a low power mode.

Tick interrupt counter: record the number of ticks is reached when an interrupt is executed, and counting is cleared for counting of a next tick interrupt.

Interrupts other than tick interrupts: interrupts generated by all non-time peripherals such as keyboards, mice, and network interfaces.

Timeout task: a task that is not executed first, and is suspended to wait for being awakened, having a timeout period. For example, if a task wakes up after sleeping for 3 seconds, a timeout period thereof is 3 seconds.

Low-power mode: a CPU goes to sleep, and a system enters a low-power mode.

Specific implementations are described in detail hereinafter.

First Embodiment

Figure 2A:
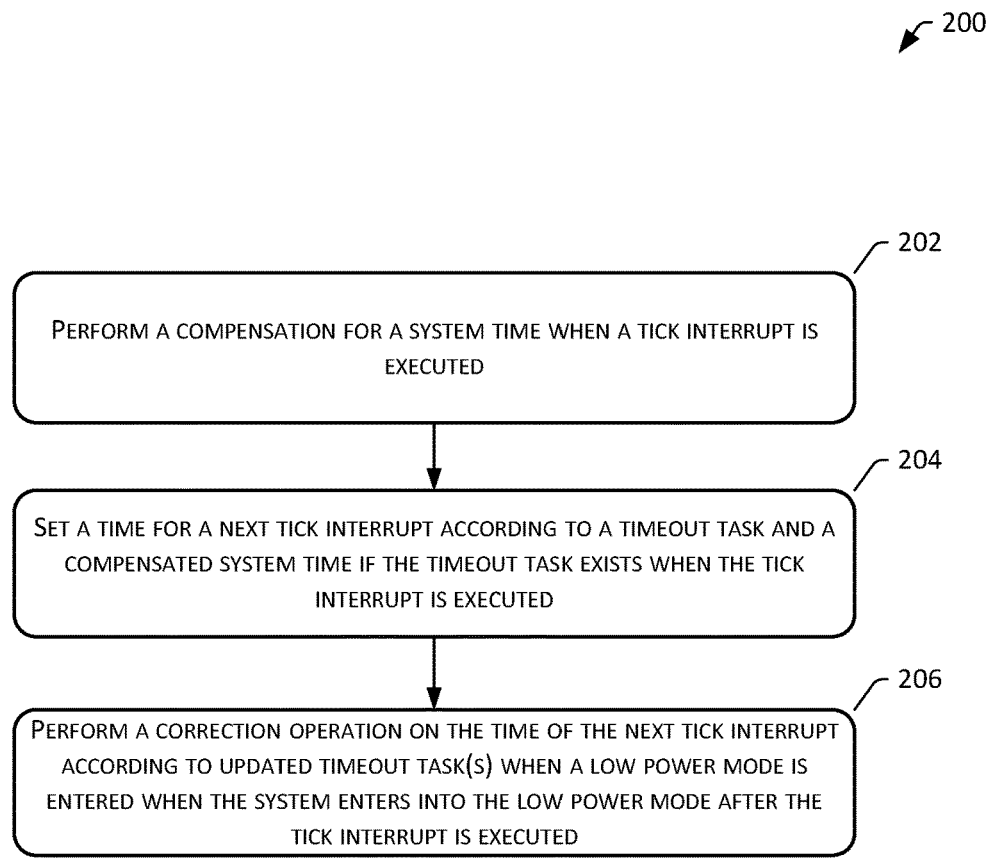
FIGS. 2A-2F show a flowchart of a method for setting a time for a tick interrupt provided by the embodiments of the present disclosure.

Referring to FIG. 2A, a flowchart of a method 200 for setting a time of a tick interrupt is shown. The method 200 may include the following operations.

Operation 202: Perform a compensation for a system time when a tick interrupt is executed.

In implementations, when a system starts, a time for a first tick interrupt can be set according to needs. As such, each time when a tick interrupt is executed, a system time needs to be compensated for the sake of the accuracy of the system time.

Moreover, the compensated system time is the basis for calculating the time for the next tick interrupt, because the aforementioned tick counter corresponding to the system time will stop counting if the system's CPU sleeps and enters the low power mode. In this case, in order to ensure normal operations of the system, the system time needs to be compensated after the CPU is woken up. The time of the next tick interrupt is calculated based on the compensated system time. If the time of the next tick interrupt is not calculated using the compensated system time, errors such as failure to timely wake up the CPU to processing tasks may occur.

In implementations, a time threshold may be set up in advance. The time of the first tick interrupt is set as the time threshold. It can be understood that the time of the first tick interrupt is set to be the time threshold at the time when the system is initiated.

It should be noted that, since a register address of a clock source counter has a range in actual devices, for example, a register address range of a 32-bit clock source counter is from 0 to 0xffffffff, the maximum address corresponds to the maximum time. In this case, the time threshold that is set cannot exceed the maximum time that can be recorded by the clock source counter, because the clock source counter starts counting from 0 again after the maximum address is reached, which causes a tick time to be missed, resulting in an inaccurate system time.

Therefore, a counted address corresponding to the time threshold that is set in implementations is not greater than the total counted address of the clock source counter.

As such, if the time corresponding to the maximum address 0xffffffff is 40 seconds, the time threshold cannot be greater than 40 second. For example, the time threshold can be set to be 10 seconds, and a count address corresponding to 10 seconds needs to be smaller than the maximum address 0xffffffff. It should be noted that a specific value of the time threshold may be set within the time range corresponding to the maximum address, and is not limited by the embodiments of the present disclosure.

In this case, when the first interrupt is executed, compensation is started to be performed for the system time, and the time for a next tick interrupt is then dynamically set. When each subsequent interrupt is executed, the system time is also compensated, and the time for a corresponding next tick interrupt is dynamically set.

Figure 2B:
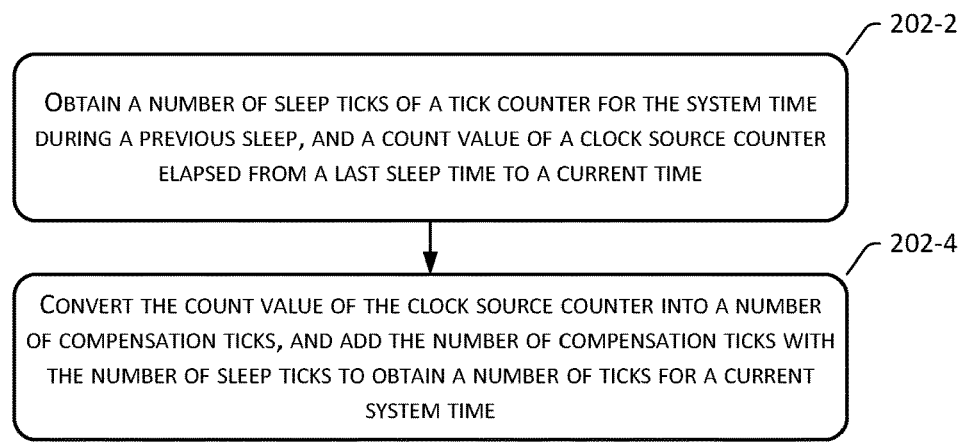

In implementations, operation 202 may include the following operations as shown in FIG. 2B.

Operation 202-2: Obtain a number of sleep ticks of a tick counter for the system time during a previous sleep, and a count value of a clock source counter elapsed from a last sleep time to a current time.

Operation 202-4: Convert the count value of the clock source counter into a number of compensation ticks, and add the number of compensation ticks with the number of sleep ticks to obtain a number of ticks for a current system time.

Each time when the system enters the low power mode, its calculation process of the system time also stops. The system records a sleep system time of the last sleep time and records a count value of the clock source counter at the sleep time at a specified position. As such, after the CPU sleeps and is then woken up by an immediate next tick interrupt, the sleep system time t1 of the last sleep time and the count value m of that time can be obtained in this wakeup of the interrupt. A current count value n of the clock source counter is then read, and a count value k that elapses from the last sleep to a current time is then obtained by using m−n. This k is then converted to a compensation time t2 according to the clock frequency of the system, and t1+t2 is then the current time of the system.

In practical applications of the present disclosure, the system time is recorded using the tick counter. In this case, the tick counter is also stopped when the CPU sleeps, for example, t1 times at this moment. When the CPU wakes up, the value t1 of the tick counter at the time of the last sleep is obtained. If the clock frequency is p1 (Mhz), then the above reads k=[(m−n)/p1M], where the symbol "[ ]" represents a rounded value. Then, the value of the tick counter is corrected to k+t1 to obtain a compensated system time.

Apparently, the process of time compensation is merely an example, and other methods may be used for performing time compensation, which are not limited by the embodiments of the present disclosure.

Operation 204: Set a time for a next tick interrupt according to a timeout task and a compensated system time if the timeout task exists when the tick interrupt is executed.

It should be noted that, in practical applications, when the system has a task that requires timeout, the timeout task is loaded into a timeout list. In this case, the present disclosure can set the time for the next tick interrupt according to the timeout task in the timeout list.

It can be understood that if no timeout task exists when the tick interrupt is executed, the time for the next tick interrupt is set to be the above time threshold.

Figure 2C:
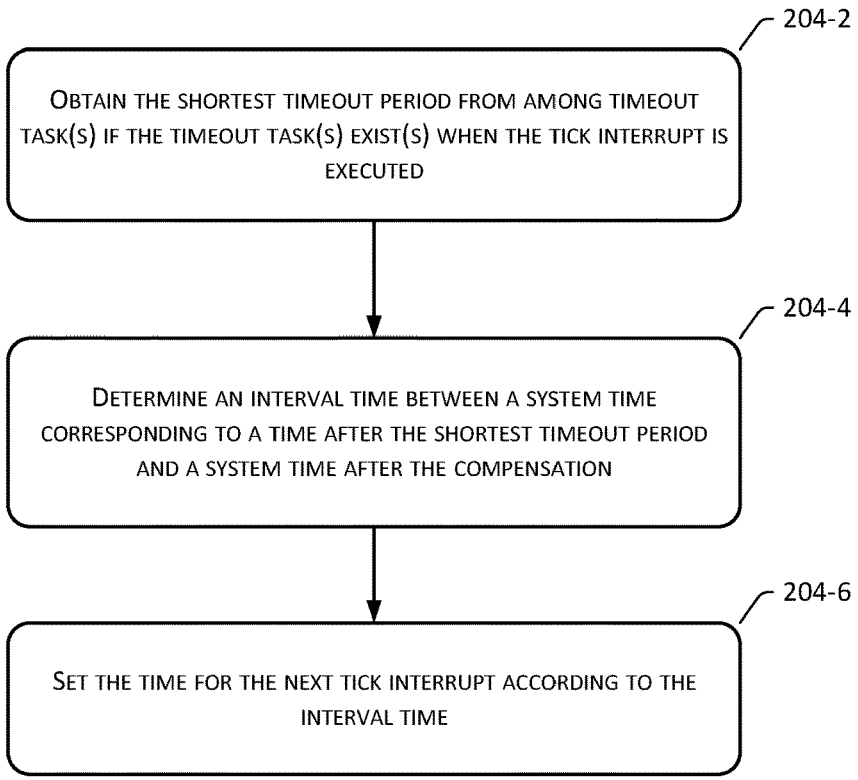

In implementations, operation 204 may include the following operations as shown in FIG. 2C.

Operation 204-2: Obtain the shortest timeout period from among timeout task(s) if the timeout task(s) exist(s) when the tick interrupt is executed.

Operation 204-4: Determine an interval time between a system time corresponding to a time after the shortest timeout period and a system time after the compensation.

Operation 204-6: Set the time for the next tick interrupt according to the interval time.

In implementations, a determination as to whether any timeout task exists in the system is needed to be performed first. In order to ensure normal operations of the system when no timeout task exists, a tick interrupt needs to be performed even if no timeout task exists in the system. In this way, when no timeout task exists in the system, the time for a next tick interrupt can be directly set to be the interrupt threshold.

When a timeout task exists in the system, the time for a next tick interrupt needs to be configured in a current tick interrupt according to an interval time between a timeout period of the timeout task and a current interrupt time.

Figure 3:
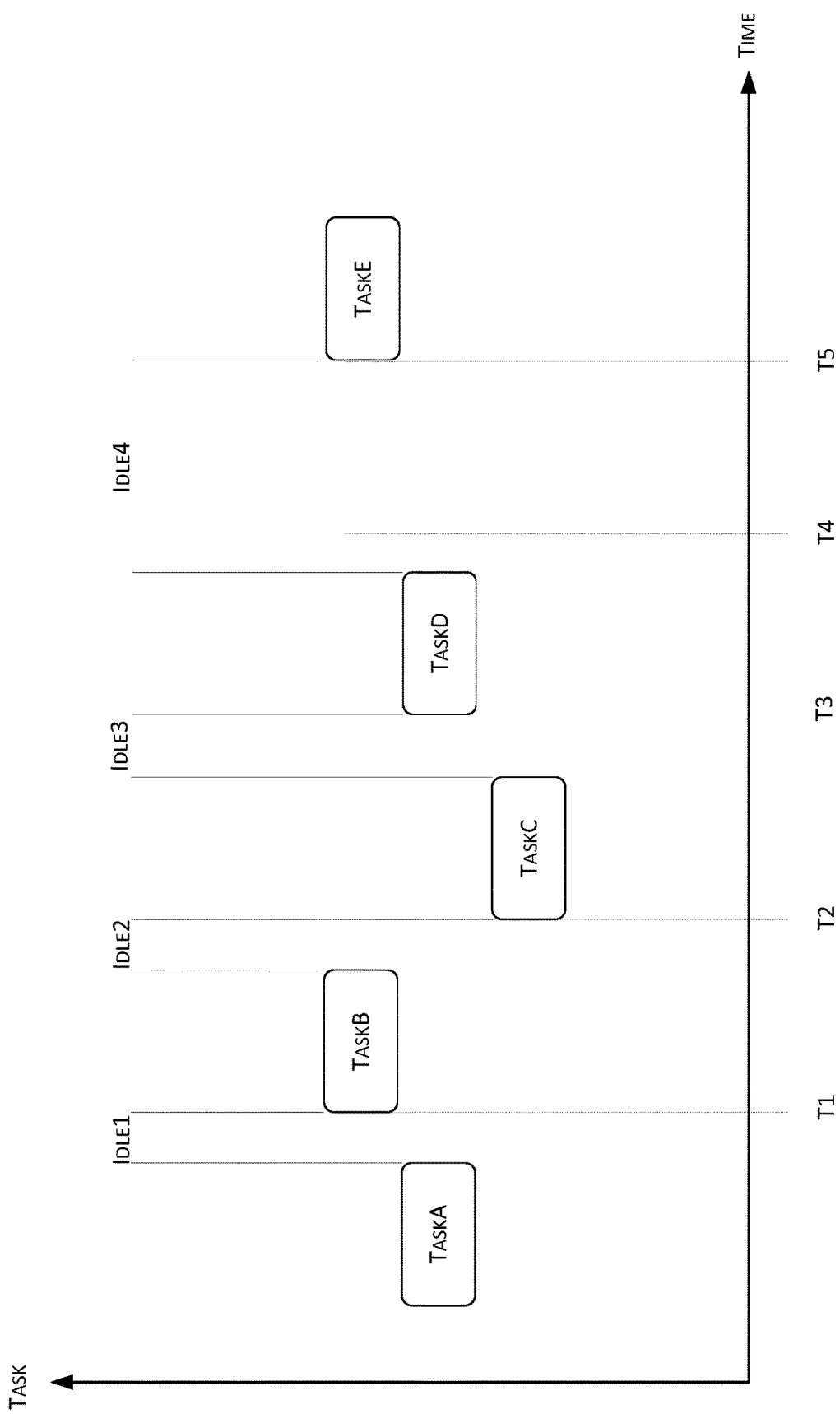
FIG. 3 shows a diagram illustrating an example of a tick interrupt provided by the embodiments of the present disclosure.

For example, five timeout tasks in FIG. 3 are Task A, Task B, Task C, Task D, and Task E. Task A has been executed after a wakeup by a corresponding tick interrupt T0 (not shown). When an interrupt time is set up in a previous tick interrupt in Task A, timeout periods of subsequent Task B, Task C, Task D, and Task E are considered. With an example of 3 seconds, 5 seconds, 7 seconds, 9 seconds, and 20 seconds for Task A, Task B, Task C, Task D, and Task E respectively, remaining timeout tasks are Task B, Task C, Task D, and Task E after the T0 interrupt in this case. At this time, the shortest timeout period is 5 seconds.

According to a corresponding system time after a lapse of 5 seconds and an actual system time after a current compensation, a time interval is then calculated. Simply put, it is a difference between the time for a next tick and the current system time. As such, in the absence of any error, the interval time of the above example is 5−3=2 seconds. Therefore, the time set for the T1 interrupt is 2 seconds with respect to the T0 interrupt. In practical applications, a tick interrupt setting function can be called to set the time for the tick interrupt time as 2 seconds.

It should be noted that, since timeout tasks are mounted in a timeout list and timeout tasks in the timeout list are sorted according to an increasing order of respective timeout periods, a time of a timeout task at the head of the timeout list can be directly obtained to be the shortest timeout period in implementations.

Apparently, for other types of ordering of timeout tasks, the shortest timeout period can also be obtained in a corresponding manner, and the embodiments of the present disclosure do not have any limitations thereon.

For the tasks in the above timeout list, when the timeout task at the head is awakened, the timeout task is removed from the head.

Apparently, the timeout tasks in implementations may also be placed in other types of timeout queues, which are not limited in implementations.

Figure 2D:
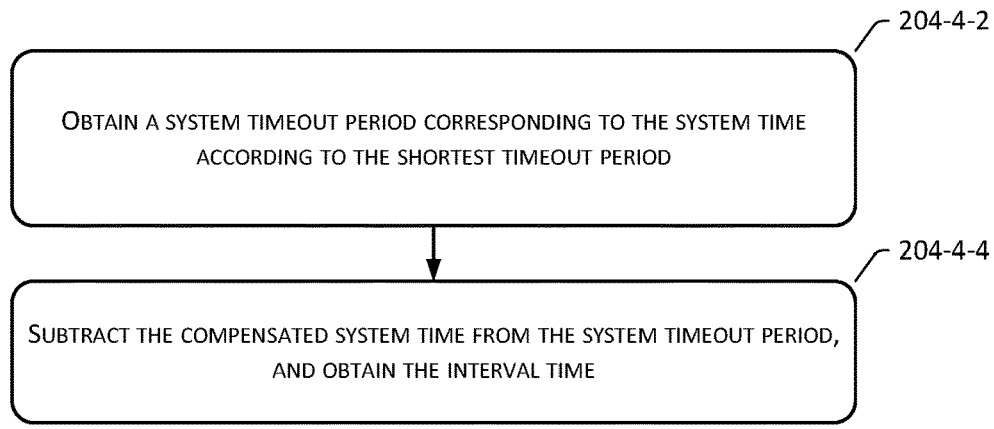

In implementations, operation 204-4 may include the following operations as shown in FIG. 2D.

Operation S204-4-2: Obtain a system timeout period corresponding to the system time according to the shortest timeout period.

Operation S204-4-4: Subtract the compensated system time from the system timeout period, and obtain the interval time.

In implementations, when one or more timeout tasks exist, the shortest timeout period is first obtained from among these tasks, and then the interval time between the timeout period and the time for the current interrupt is calculated.

Apparently, in practical applications, in situations where a task having the shortest timeout period is placed in the head of the timeout list, after determining that a current timeout task in the head of the timeout list is not a previous timeout task at the head, this means that the previous timeout task is awakened. In this case, the interval time for the current timeout task at the head needs to be calculated. In other words, the present disclosure is to obtain a time interval between the time when a timeout task is awakened and a current system time.

In implementations, for a timeout task newly received at the time of wakeup, the timeout period is made to correspond to the system time for completing the timeout period, when the timeout is added to the timeout list when the sleep function is called. For example, the system time during sleep is 10 minutes and 10 seconds, and the timeout period of the newly added timeout task is 5 seconds. Then the system timeout time corresponding to the system time is 10 minutes and 15 seconds, which means that the timeout task is awakened when the system time reaches 10 minutes and 15 seconds.

For the foregoing example, for example, the time when the CPU sleeps is 10 minutes and 10 seconds before T0, and the system time after compensation in the 0 interrupt is 10 minutes and 13 seconds. The system timeout time corresponding to the system time of Task B that is obtained is 10 minutes and 15 seconds. In this case, the time interval that is obtained is 2 seconds, by subtracting 10 minutes and 13 seconds from the 10 minutes and 15 seconds.

For example, before T1, the time when the CPU sleeps is 10 minutes and 14 seconds, and the system time after compensation due to T1 interrupt is 10 minutes and 15 seconds. The system timeout time of Task C corresponding to the system time that is obtained is 10 minutes and 17 seconds. In this case, the time interval that is obtained is 2 seconds, by subtracting 10 minutes and 15 seconds from the 10 minutes and 17 seconds. Other cases are done in a similar manner.

Apparently, in practical applications, the system time is counted by the number of ticks. For instance, the above examples of 10 minutes 15 seconds and 10 minutes 13 seconds each corresponds to a respective tick value. As such, the above time interval is also a tick value.

Apparently, it should be noted that if timeout period(s) of timeout task(s) in the timeout list is/are calculated and recorded according to system times, the timeout period(s) is/are system time(s) when being awakened up. For example, the system time at the time of mounting thereon is 10 minutes 00 seconds, a sleep thereof takes 5 seconds, and a timeout period that is recorded is 10 minutes and 05 seconds. In this case, the timeout period can be directly obtained. When an interval time is calculated, the current system time can be directly subtracted by the timeout period, and this system time can be the time that has gone through time compensation after the aforementioned tick wakeup. The specific method of calculating an interval time is not limited in implementations.

Figure 2E:
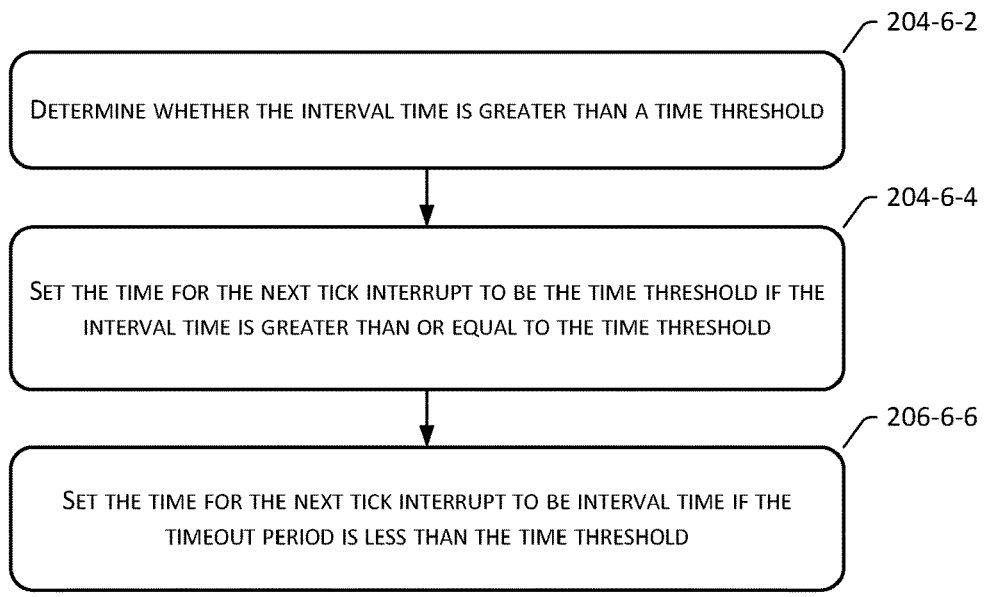

In implementations, operation 204-6 may include the following operations as shown in FIG. 2E.

Operation 204-6-2: Determine whether the interval time is greater than a time threshold.

Operation 204-6-4: Set the time for the next tick interrupt to be the time threshold if the interval time is greater than or equal to the time threshold.

Operation 204-6-6: Set the time for the next tick interrupt to be interval time if the timeout period is less than the time threshold.

For example, in the foregoing example of FIG. 3, if the system time is 0 second when 3 seconds, 5 seconds, 7 seconds, 9 seconds, and 20 seconds are added to the timeout list, respective system times corresponding to 3 seconds, 5 seconds, 7 seconds, 9 seconds, and 20 seconds are 3 seconds, 5 seconds, 7 seconds, 9 seconds, and 20 seconds. When the T1 interrupt is executed, the tasks in the timeout list are Task C, Task D, and Task E, the timeout periods are 7 seconds, 9 seconds, and 20 seconds respectively. In this case, the shortest timeout period is 7 s. The interval time between the 7 s and the current interrupt is calculated to be 7−5=2 seconds using the foregoing process. At this time, a first determination is made that 2 seconds are less than 10 seconds. As such, the time for the next tick interrupt T2 of T1 is set to be 2 seconds.

Similarly, when the T2 interrupt is executed, there are also Task D and Task E, and the shortest timeout period is 9 seconds. The calculated interval time is 9−7 seconds=2 seconds, with 2 seconds being less than 10 seconds. As such, the time for the next tick interrupt T3 in T2 is set to be 2 seconds.

When the T3 interrupt is executed, the timeout task also has Task E, and the timeout time period is 20 s. The interval time for the time of the current interrupt is 20−9=16 seconds. Since 16 seconds are greater than 10 seconds, then the time for the next tick interrupt T4 is set to be 10 seconds.

Then, when the T4 interrupt is executed, the timeout task also has Task E, and the interval time is 20 s. The interval for the time of the current interrupt is 20−19=6 seconds, and 6 seconds are less than 10 seconds. As such, the time T5 in the T4 interrupt is set to be 6 seconds.

In practical applications, after determining the time for the next tick interrupt, such time can be converted into a count value L of the tick interrupt counter. This count value L is then stored in a comparison register of the tick interrupt counter. An interrupt is generated if a count value of the tick interrupt counter is increased and matches the value recorded in the comparison register.

Apparently, in practical applications, since the system time is the number of counts of the tick counter, the time threshold is also converted into a corresponding number of ticks. For example, if the tick period is 100 Hz, the time threshold of 10 seconds is 1000 times. As such, the time for the next tick is also a tick number. Therefore, a tick interrupt counter may be set up, which is independent from the tick counter and the clock source counter, to record whether the number of ticks reaches the number of times for the next tick interrupt. If reached, a tick interrupt is generated, and the tick interrupt counter is cleared to 0 for performing the next counting.

Operation 206: Perform a correction operation on the time of the next tick interrupt according to updated timeout task(s) when a low power mode is entered when the system enters into the low power mode after the tick interrupt is executed.

During a wake-up of the system, various tasks may be processed, and various new timeout tasks are received. As such, the system will place the newly received timeout tasks to the timeout list, and the time for a tick interrupt is then needed to be corrected using updated timeout tasks. It is because if there is a timeout task that has a timeout period that is shorter than the original shortest timeout period in the timeout list, such timeout task cannot be woken up if the time of the tick interrupt is not corrected.

Figure 2F:
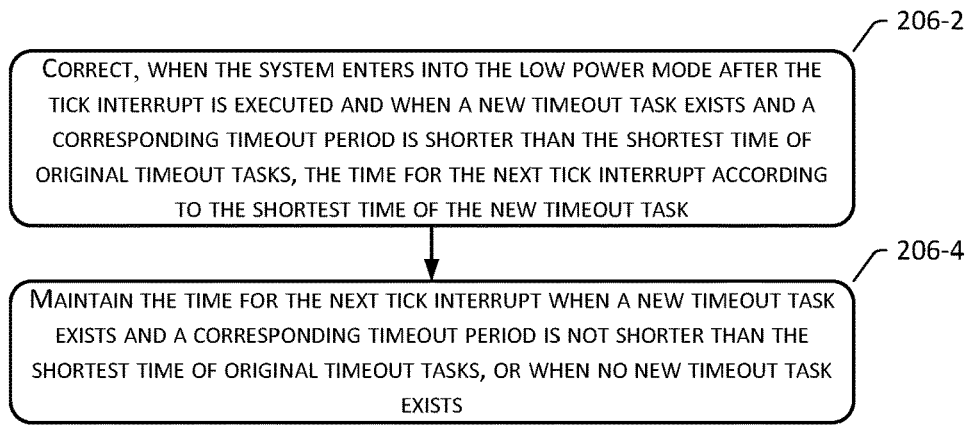

In implementations, operation 206 may include the following operations as shown in FIG. 2F.

Operation 206-2: Correct, when the system enters into the low power mode after the tick interrupt is executed and when a new timeout task exists and a corresponding timeout period is shorter than the shortest time of original timeout tasks, the time for the next tick interrupt according to the shortest time of the new timeout task.

Operation 206-4: Maintain the time for the next tick interrupt when a new timeout task exists and a corresponding timeout period is not shorter than the shortest time of original timeout tasks, or when no new timeout task exists.

It can be understood that when the system calls the sleep function to make the CPU sleep, so that the system enters into the low power mode, new timeout task(s) is/are loaded into the timeout list, and the timeout list is reordered. The following situations may occur:

1. A timeout task of new timeout task(s) having a timeout period that is shorter than the original timeout period exists;

2. A timeout task of the new timeout task(s) having a timeout period that is the same as the original timeout period exists;

3. A timeout task of the new timeout task(s) having a timeout period that is longer than the original timeout period exists.

For 1, the time of the tick interrupt that is previously set needs to be modified, and no modification needs to be performed for 2 and 3. Therefore, it can be understood that the above correction operation may include two types of operations modifying and not processing.

Task C, Task D, and Task E in FIG. 3 are used as an example. At this point, the CPU is woken up to perform task TaskB. In this process, Task M newly appears, and a timeout period of TaskM is 6 seconds. In this case, the timeout tasks in the timeout list are sorted according to time into TaskM (6 seconds), Task C (7 seconds), Task D (9 seconds), and Task (20 seconds). TaskM is 1 second earlier than the interrupt set by T1 interrupt for the T2 interrupt of TaskC. Therefore, a tick interrupt time setting function is needed to be called at this time to change the time of the T2 interrupt from 2 seconds to 1 second. In addition, if the timeout period of TaskM is 7 seconds or more, this timeout period has no effect on the time of T2 interrupt, so no modification is needed to be performed thereon, and the time of T2 interrupt is not processed. Other cases are performed in a similar manner.

Apparently, the adjustment result of the above-mentioned sleep function on the timeout list is merely an example, which is not limited in implementations.

In practical applications, a sleep function can adjust a timeout list in a variety of ways, such as changing an initial timeout period of a timeout task that is inputted to a timeout period based on a starting time point, such as TaskB, Task C, and Task E, using 0 second as their starting time points. If an initial sleep time requested by TaskM is actually 1 second for sleep, the timeout time period of TaskM that starts from 0 second is 5+1=6 second because the 5 seconds of TaskB are past. In this way, the foregoing timeout list of TaskM (6 seconds), Task C (7 seconds), Task D (9 seconds), and Task (20 seconds) is obtained. Apparently, the adjustment of the timeout list by the sleep function can also remove the actual time that has elapsed for existing timeout tasks. For example, the actual sleep times of Task B, Task C, Task D, and Task E are 5 seconds, 7 seconds, 9 seconds, and 20 seconds. When the T1 interrupt is set, this means 5 seconds have elapsed. In this case, the sleep function can perform a reduction of the 5 seconds that elapse when processing the timeout list. Therefore, the remaining timeout periods of Task C, Task D and Task E are 2 seconds, 7 seconds and 15 seconds respectively. At this time, after TaskM that actually sleeps for 1 second is added, the timeout list is TaskM (1 second), Task C (2 seconds), Task D (7 seconds), and Task (15 seconds). The present disclosure does not limit how a sleep function adjusts a timeout list, as long as timeout periods of timeout tasks are ensured to belong to a same reference system, thus ensuring that the time that a task is awakened satisfies its own requirements.

In implementations, when the sleep function is called, the timeout periods of the original timeout tasks in the timeout list are not changed. For a new timeout task that occurs before sleep, it is inserted into the timeout list according to the actual time that it needs to be awakened. For example, a timeout task is received in a wake-up state before sleep, and this timeout task requests to be woken up at 5 seconds after sleep. In this case, the sleep function adds this task into the timeout list, and records its timeout period as 5 seconds in the list. In addition, because the tick needs to be corrected, the system time corresponding to the timeout period of the new timeout task is obtained. For example, the system time when sleep is 10 minutes and 30 seconds, and the system time corresponding to the timeout period is 10 minutes and 35 seconds in this case.

Through the above solutions of the embodiments of the present disclosure, the following advantages are obtained:

First, the entire solution is configured for tick interrupts of a system. Therefore, the present disclosure decouples the tick interrupts of the system from Idle tasks. As such, any wake-ups caused by interrupts other than tick interrupts will not trigger such action of time compensation.

Second, relative to the solution of setting a time for a next tick interrupt in an Idle task, the Idle task can only control a tick interrupt in a current task cycle. For example, Idle1 in FIG. 1 can only control such tick interrupt of T1 at a start moment of Task B, and cannot control tick interrupts in the entire system globally. The present disclosure for tick interrupts is a system-level dynamic tick solution, which control tick interrupts of the entire system.

Moreover, as compared with the existing technologies, a process of time compensation in an Idle task involves the Idle task, a CPU and other tasks, having a very complicated processing logic. As such, a statement of execution is complicated, and an execution time is long. Furthermore, because preemption is turned off, Idle tasks are the lowest priority-level tasks, and therefore high-priority-level tasks are not scheduled, which affects real-time performance. A tick interrupt of the present disclosure is decoupled from an Idle task, and a time compensation is made in the tick interrupt, instead of performing the time compensation in the Idle task, having a simple processing logic. Therefore, the process of compensation in implementations is simple, and preemption is not turned off, having a low real-time impact.

Moreover, after setting a next tick time in a tick interrupt of the present disclosure, when the system enters into a low power mode after the tick interrupt is executed, a correction operation is performed on a time for a next tick interrupt according to timeout task(s) that is/are updated when the low power mode is entered, thus ensuring that the newly added task(s) can also be normally woken up by the tick interrupt to avoid system errors.

Second Embodiment

Figure 4A:
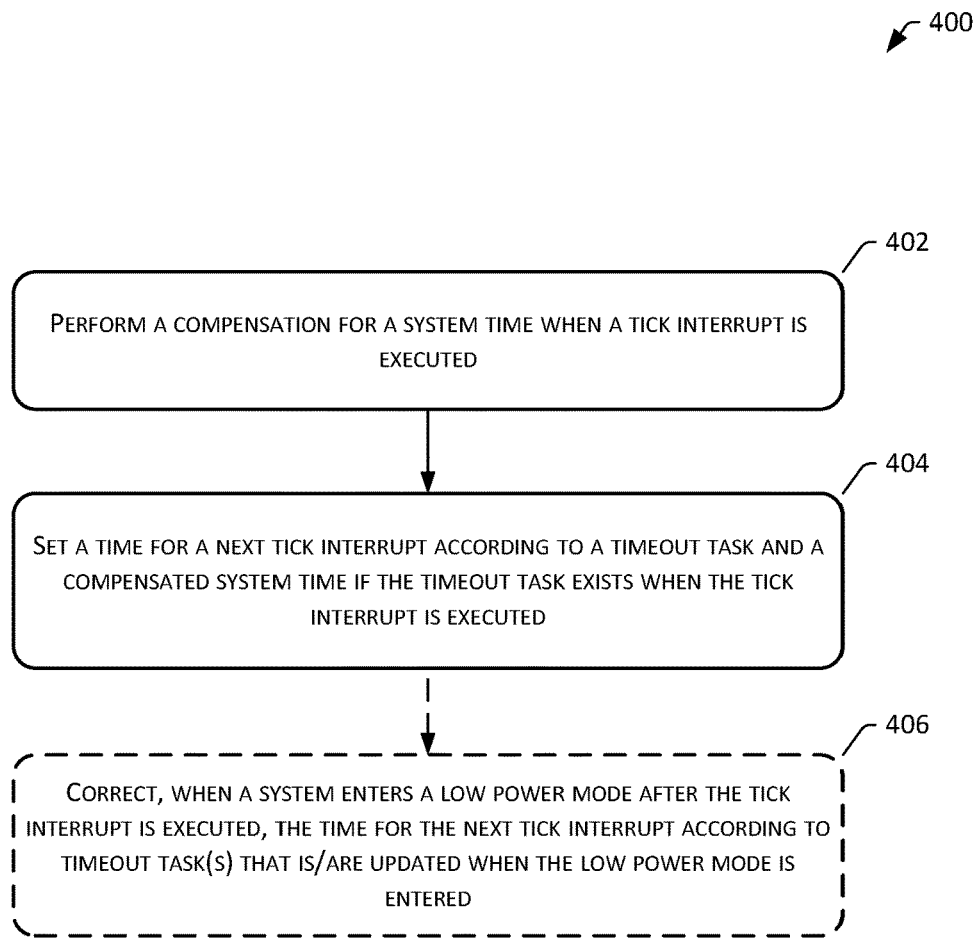
FIGS. 4A-4F show a flowchart of another method for setting a time for a tick interrupt provided by the embodiments of the present disclosure.

Referring to FIG. 4A, a flowchart of a tick interrupt time setting method 400 is illustrated. The method 400 may include the following operations.

Operation 402: Perform a compensation for a system time when a tick interrupt is executed.

Operation 404: Set a time for a next tick interrupt according to a timeout task and a compensated system time if the timeout task exists when the tick interrupt is executed.

The principles of operations 402 and 404 are similar to those of operations 202 and 204 of the first embodiment, and are not described in detail herein.

In implementations, the method may further include the following operation:

Operation 406: Correct, when a system enters a low power mode after the tick interrupt is executed, the time for the next tick interrupt according to timeout task(s) that is/are updated when the low power mode is entered.

The principles of operation 406 are similar to those of operation 206 of the first embodiment, and are not described in detail herein.

This operation is to ensure that a newly added task can also be woken up normally by a tick interrupt to avoid system errors.

Figure 4B:
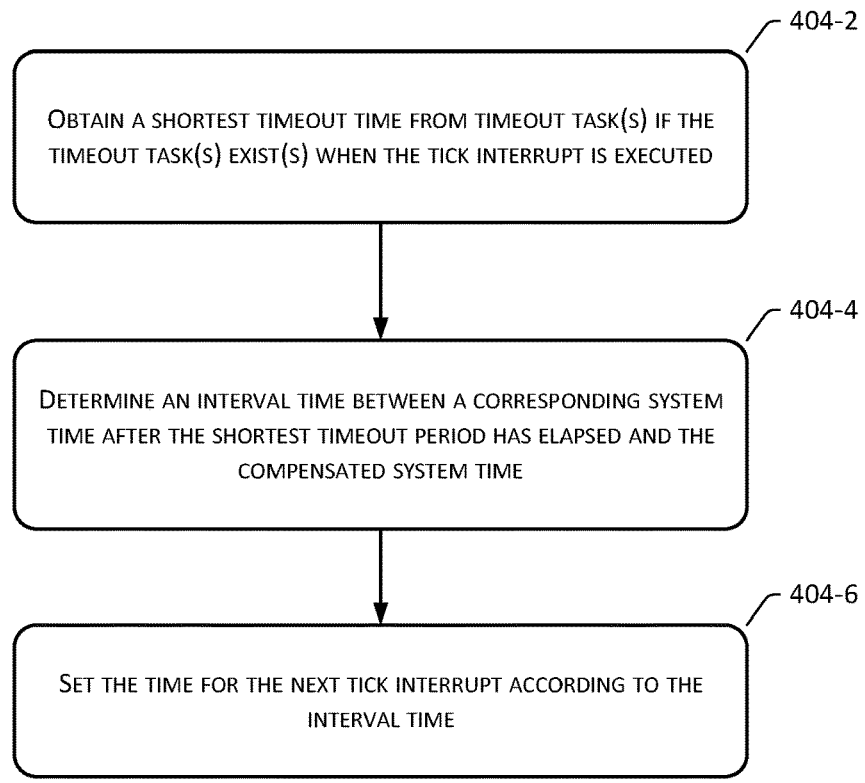

In implementations, operation 404 may include the following operations as shown in FIG. 4B.

Sub-operation 404-2: Obtain a shortest timeout time from timeout task(s) if the timeout task(s) exist(s) when the tick interrupt is executed.

Sub-operation 404-4: Determine an interval time between a corresponding system time after the shortest timeout period has elapsed and the compensated system time.

Sub-operation 404-6: Set the time for the next tick interrupt according to the interval time.

The principles of sub-operations 404-2-404-6 are similar to those of sub-operations 204-2-204-6 of the first embodiment, and are not described in detail herein.

Figure 4C:
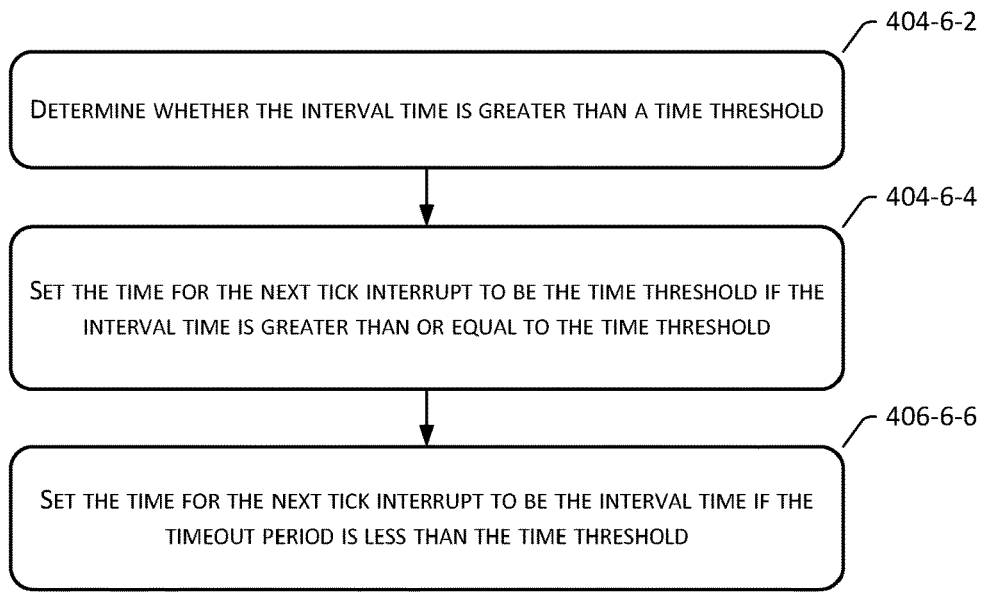

In implementations, sub-operation 404-6 may include the following operations as shown in FIG. 4C.

Sub-operation 404-6-2: Determine whether the interval time is greater than a time threshold.

Sub-operation 404-6-4: Set the time for the next tick interrupt to be the time threshold if the interval time is greater than or equal to the time threshold.

Sub-operation 404-6-6: Set the time for the next tick interrupt to be the interval time if the timeout period is less than the time threshold.

The principles of sub-operations 404-6-2-404-6-6 are similar to those of sub-operations 204-6-2-204-6-6 of the first embodiment, and are not described in detail herein.

Figure 4D:
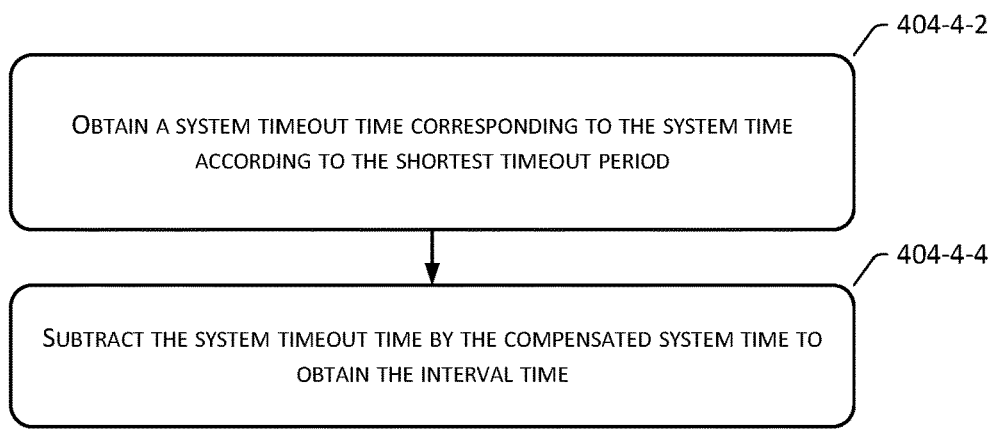

In implementations, sub-operation 404-4 may include the following operations as shown in FIG. 4D.

Sub-operation 404-4-2: Obtain a system timeout time corresponding to the system time according to the shortest timeout period.

Sub-operation 404-4-4: Subtract the system timeout time by the compensated system time to obtain the interval time.

The principles of sub-operations 404-4-2-404-4-4 are similar to those of sub-operations S221-S222 of the first embodiment, and are not described in detail herein.

In implementations, a count address corresponding to the time threshold is not greater than a total count address of a clock source counter.

In implementations, the method may further include: setting a time for a first tick interrupt to be the time threshold when the system is initialized.

Figure 4E:
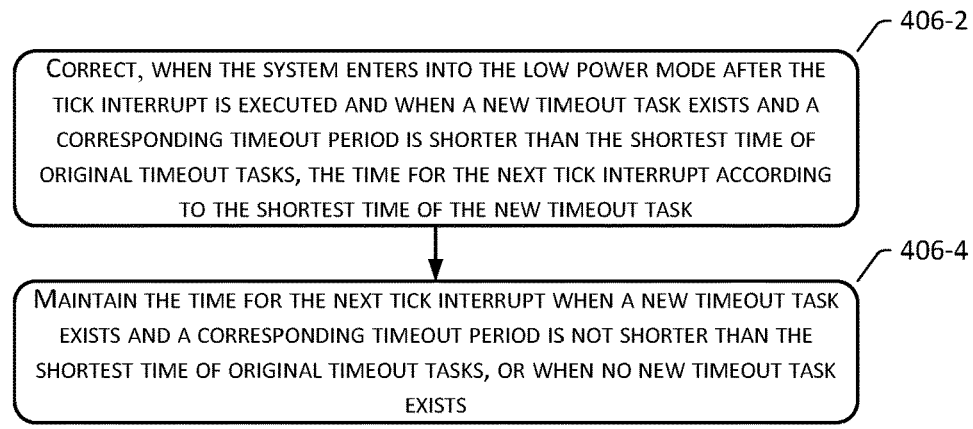

In implementations, operation 406 may include the following operations in as shown in FIG. 4E.

Sub-operation 406-2: Correct, when the system enters into the low power mode after the tick interrupt is executed and when a new timeout task exists and a corresponding timeout period is shorter than the shortest time of original timeout tasks, the time for the next tick interrupt according to the shortest time of the new timeout task.

Sub-operation 406-4: Maintain the time for the next tick interrupt when a new timeout task exists and a corresponding timeout period is not shorter than the shortest time of original timeout tasks, or when no new timeout task exists.

The principles of sub-operations 406-2-406-4 are similar to those of sub-operations 206-2-206-4 of the first embodiment, and are not described in detail herein.

Figure 4F:
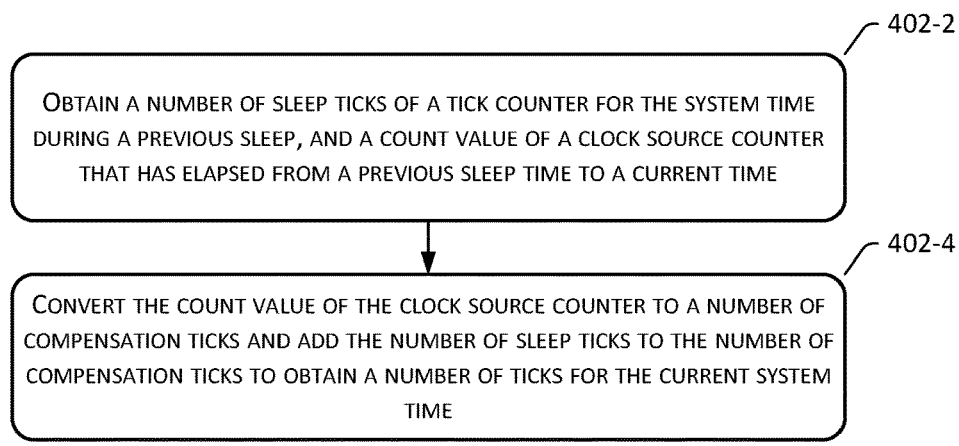

In implementations, operation 402 may include the following operations in as shown in FIG. 4F.

Sub-operation 402-2: Obtain a number of sleep ticks of a tick counter for the system time during a previous sleep, and a count value of a clock source counter that has elapsed from a previous sleep time to a current time.

Sub-operation 402-4: Convert the count value of the clock source counter to a number of compensation ticks and add the number of sleep ticks to the number of compensation ticks to obtain a number of ticks for the current system time.

The principles of sub-operations 402-2-402-4 are similar to those of sub-operations 202-2-202-4 of the first embodiment, and are not described in detail herein.

In implementations, the method further includes: setting the time for the next tick interrupt to be the time threshold if no timeout task exists when the tick interrupt is executed.

The principles of the operations of the embodiment of the present disclosure are similar to those of the first embodiment, and are not be described in detail herein.

The above embodiment has the following advantages.

First, the entire solution is configured for tick interrupts of a system. Therefore, the present disclosure decouples the tick interrupts of the system from Idle tasks. As such, any wake-ups caused by interrupts other than tick interrupts will not trigger such action of time compensation.

Second, relative to the solution of setting a time for a next tick interrupt in an Idle task, the Idle task can only control a tick interrupt in a current task cycle. For example, Idle1 in FIG. 1 can only control such tick interrupt of T1 at a start moment of Task B, and cannot control tick interrupts in the entire system globally. The present disclosure for tick interrupts is a system-level dynamic tick solution, which control tick interrupts of the entire system.

Moreover, as compared with the existing technologies, a process of time compensation in an Idle task involves the Idle task, a CPU and other tasks, having a very complicated processing logic. As such, a statement of execution is complicated, and an execution time is long. Furthermore, because preemption is turned off, Idle tasks are the lowest priority-level tasks, and therefore high-priority-level tasks are not scheduled, which affects real-time performance. A tick interrupt of the present disclosure is decoupled from an Idle task, and a time compensation is made in the tick interrupt, instead of performing the time compensation in the Idle task, having a simple processing logic. Therefore, the process of compensation in implementations is simple, and preemption is not turned off, having a low real-time impact.

Third Embodiment

Figure 5:
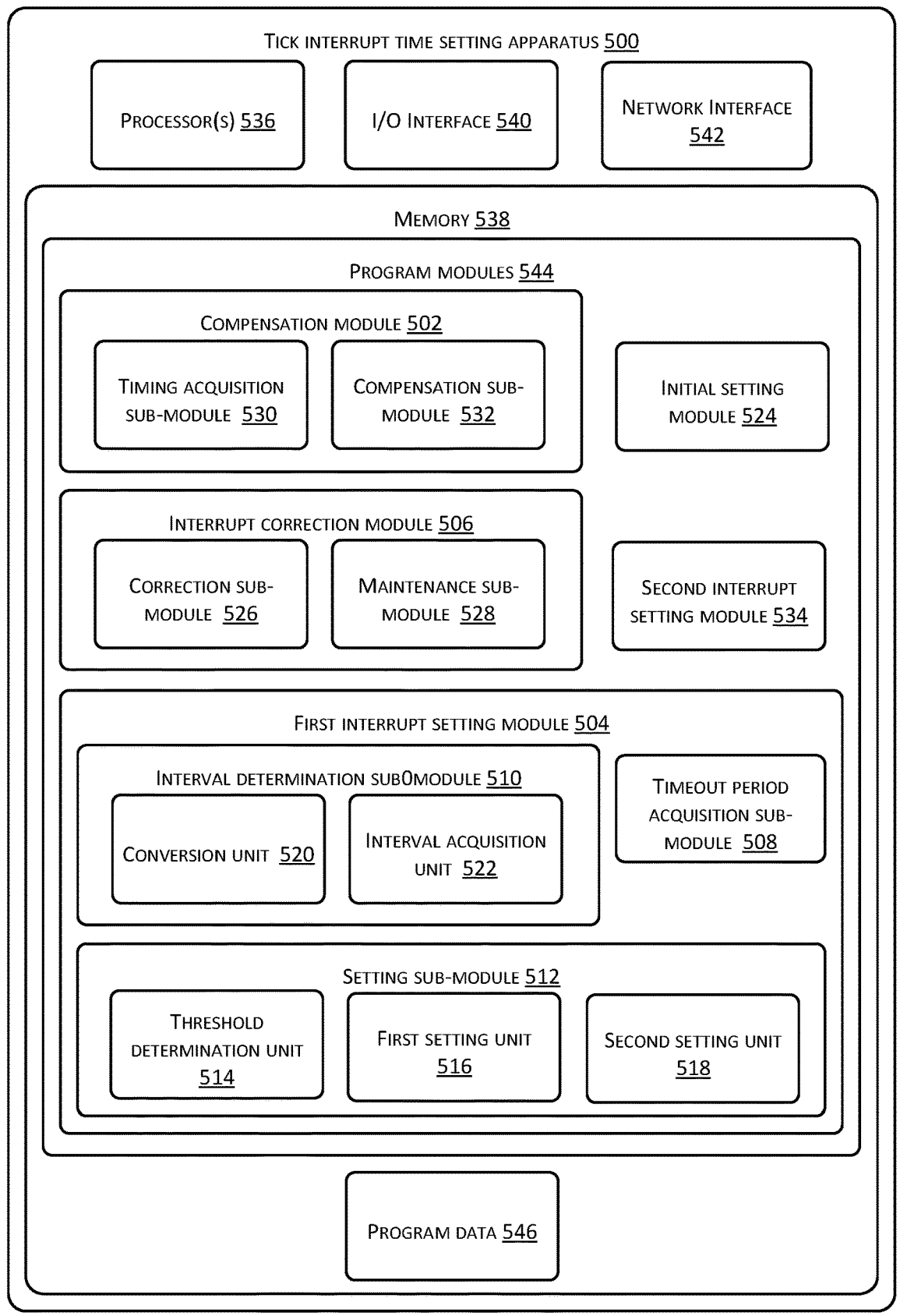
FIG. 5 shows a structural block diagram of an apparatus for setting a time for a tick interrupt provided by the embodiments of the present disclosure.

Referring to FIG. 5, a schematic structural diagram of a tick interrupt time setting apparatus is shown. The apparatus may specifically include the following modules.

A compensation module 502 is configured to compensate a system time when a tick interrupt is executed.

A first interrupt setting module 504 is configured to set a time of a next tick interrupt according to a timeout task and a compensated system time if the timeout task exists when the tick interrupt is executed.

An interrupt correction module 506 is configured to correct, when a system enters into a low power mode after the tick interrupt is executed, the time of the next tick interrupt according to the timeout task that is updated when the low power mode is entered.

In implementations, the first interrupt setting module 504 includes:

a timeout period acquisition sub-module 508 configured to obtain a shortest timeout period from among timeout task(s) if the timeout task(s) exist(s) when the tick interrupt is executed;

an interval determination sub-module 510 configured to determine an interval time between a corresponding system time after the shortest timeout period has elapsed and the compensated system time; and a setting sub-module 512 configured to set the time for the next tick interrupt according to the interval time.

In implementations, the setting sub-module 512 includes:

a threshold determination unit 514 configured to determine whether the interval time is greater than a time threshold;

a first setting unit 516 configured to set the time for the next tick interrupt to be the time threshold if the interval time is greater than or equal to the time threshold; and a second setting unit 518 configured to set the time for the next tick interrupt to be the interval time if the timeout period is less than the time threshold.

In implementations, the interval determination sub-module 510 includes:

a conversion unit 520 configured to obtain a system timeout time corresponding to the system time according to the shortest timeout period; and an interval acquisition unit 522 configured to subtract the system timeout time by the compensated system time to obtain the interval time.

In implementations, a count address corresponding to the time threshold is not greater than a total count address of a clock source counter.

In implementations, the apparatus 500 may also include:

an initial setting module 524 configured to set a time for a first tick interrupt as the time threshold when the system is initialized.

In implementations, the interrupt correction module 506 includes:

a correction sub-module 526 configured to correct, when the system enters into the low power mode after the tick interrupt is executed and when a new timeout task exists and a corresponding timeout period is shorter than the shortest time of original timeout tasks, the time for the next tick interrupt according to the shortest time of the new timeout task; and a maintenance sub-module 528 configured to maintain the time for the next tick interrupt when a new timeout task exists and a corresponding timeout period is not shorter than the shortest time of original timeout tasks, or when no new timeout task exists.

In implementations, the compensation module 502 may include:

a timing acquisition sub-module 530 configured to obtain a number of sleep ticks of a tick counter for the system time during a previous sleep, and a count value of a clock source counter that has elapsed from a previous sleep time to a current time; and a compensation sub-module 532 configured to convert the count value of the clock source counter to a number of compensation ticks and adding the number of sleep ticks to the number of compensation ticks to obtain a number of ticks for the current system time.

In implementations, the apparatus 500 may further include:

a second interrupt setting module 534 configured to set the time for the next tick interrupt as the time threshold if no timeout task exists when the tick interrupt is executed.

In implementations, the apparatus 500 may further include one or more processors 536, a memory 538, an input/output (I/O) interface 540, and a network interface 542.

The memory 538 may include a form of processor-readable media such as a volatile memory, a random access memory (RAM) and/or a non-volatile memory, for example, a read-only memory (ROM) or a flash RAM. The memory 538 is an example of a processor readable media.

The processor-readable media may include a volatile or non-volatile type, a removable or non-removable media, which may achieve storage of information using any method or technology. The information may include a machine-readable instruction, a data structure, a program module or other data. Examples of processor-readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor-readable media does not include transitory media, such as modulated data signals and carrier waves.

In implementations, the memory 538 may include program modules 544 and program data 546. The program modules 544 may include one or more modules as described in the foregoing description and shown in FIG. 5.

In implementations, an apparatus is further provided, and includes: one or more processors; and one or more computer readable media storing instructions that, when executed by the one or more processors, cause the apparatus to perform a method including the following:

performing a compensation for a system time when a tick interrupt is executed;

setting a time of a next tick interrupt according to a timeout task and a compensated system time if the timeout task exists when the tick interrupt is executed; and when a system enters into a low power mode after the tick interrupt is executed, correcting the time of the next tick interrupt according to the timeout task that is updated when the low power mode is entered.

Apparently, it is also possible to perform other operations involved in the first embodiment, and specific operations that are performed may refer to the description of corresponding operations of the embodiment.

In implementations, one or more computer readable media storing instructions that, when executed by one or more processors, cause a device to perform the tick interrupt time setting method of the first embodiment, are also provided.

In implementations, an apparatus is further provided, and includes: one or more processors; and in one or more computer readable media storing instructions that, when executed by the one or more processors, cause the apparatus to perform a method including the following:

performing a compensation for a system time when a tick interrupt is executed; and setting a time for a next tick interrupt according to a timeout task and a compensated system time is the timeout task exists when the tick interrupt is executed.

Apparently, it is also possible to perform other operations involved in the second embodiment, and specific operations that are performed may refer to the description of corresponding operations of the embodiment.

In implementations, one or more computer readable media storing instructions that, when executed by one or more processors, cause a device to perform the tick interrupt time setting method of the second embodiment, are also provided.

Fourth Embodiment

Figure 6:
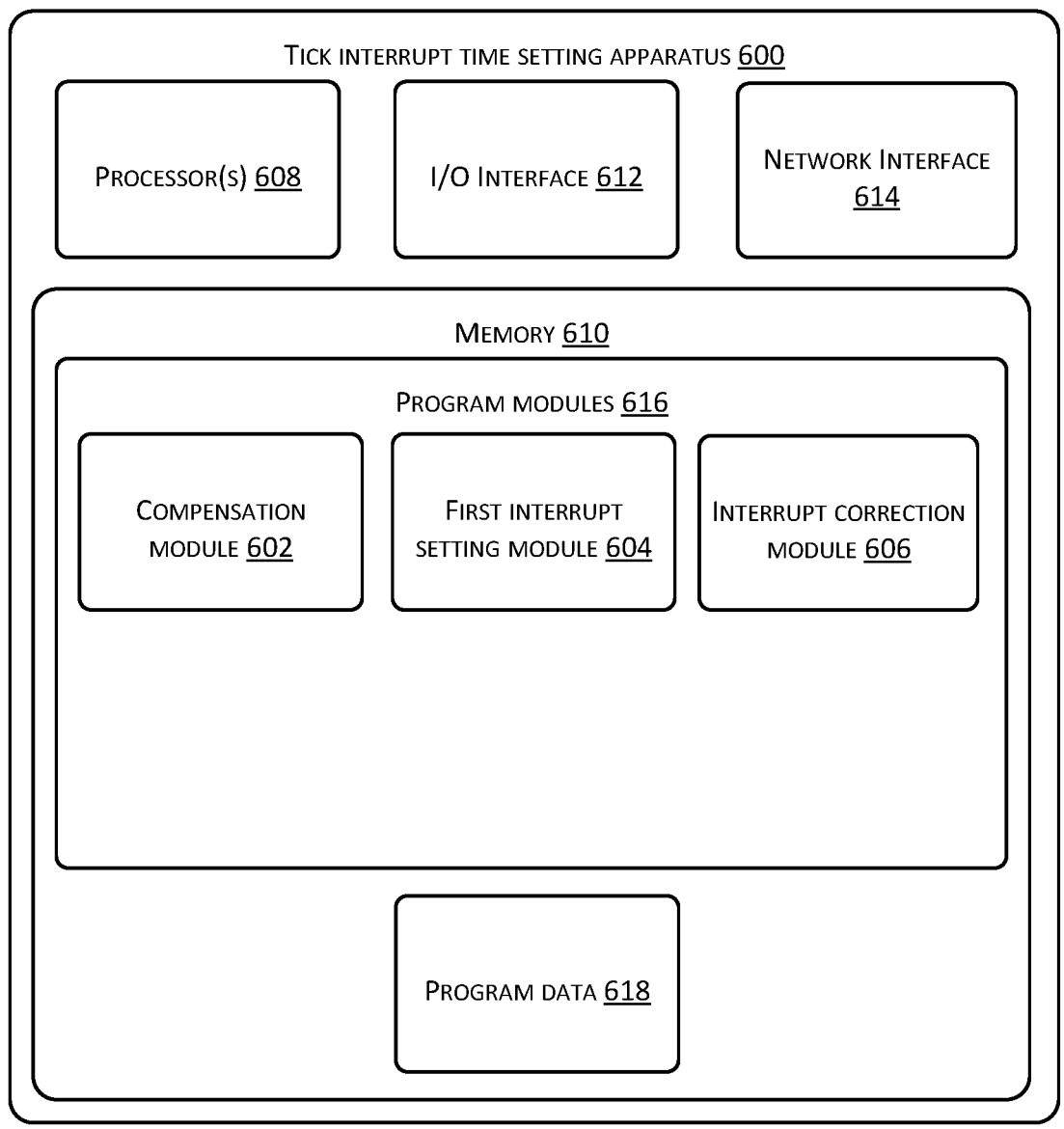
FIG. 6 shows a structural block diagram of another apparatus for setting a time for a tick interrupt provided by the embodiments of the present disclosure.

Referring to FIG. 6, a schematic structural diagram of a tick interrupt time setting apparatus 600 is shown. The apparatus 600 may include the following modules:

a compensation module 602 configured to perform a compensation for a system time when a tick interrupt is executed; and a first interrupt setting module 604 configured to set a time for a next tick interrupt according to a timeout task and a compensated system time is the timeout task exists when the tick interrupt is executed.

In implementations, the apparatus 600 further includes: an interrupt correction module 606 configured to correct, when a system enters into a low power mode after the tick interrupt is executed, the time of the next tick interrupt according to the timeout task that is updated when the low power mode is entered.

In implementations, the apparatus 600 may further include one or more processors 608, a memory 610, an input/output (I/O) interface 612, and a network interface 614. The memory 610 may include a form of processor-readable media as described in the foregoing description. In implementations, the memory 610 may include program modules 616 and program data 618. The program modules 616 may include one or more modules as described in the foregoing description and shown in FIG. 6. In implementations, the apparatus 600 may further include one or more other modules in FIG. 5.

For specific implementations of each module in the second embodiment, the description of operations in the first embodiment corresponding to the modules can be referenced, and details thereof are not described herein again.

From the above description of the embodiments, one skilled in the art can clearly understand that the present disclosure can be implemented by means of software plus a necessary general hardware platform. Based on such understanding, the essence of the technical solutions of the present disclosure or the parts that make contributions to the existing technologies may be embodied in a form of a software product. Such computer software product may be stored in a storage medium, such as a ROM/RAM, a magnetic disk, an optical disk, etc., and includes instructions for causing a computing device (which may be a personal computer, a server, or a network device, etc.) to perform the methods described in various embodiments or certain portions of the embodiments of the present disclosure.

The various embodiments in the specification are described in a progressive manner, and same or similar parts between the various embodiments may be referenced to each other. Each embodiment focuses on aspects that are different from those of the other embodiments. In particular, due to their substantially similarities to the method embodiments, the description of the systems or system embodiments is relatively simple, and related parts can be referenced to the description of the method embodiments. The systems and system embodiments described above are merely illustrative. The units described therein as separate components may or may not be physically separate, and the components displayed as units may or may not be physical units, i.e., can be located in a single place, or can be distributed among multiple network units. Some or all of the modules may be selected according to actual needs to achieve the purpose of the solutions of the embodiments. One of ordinary skill in the art can understand and perform implementations without making any creative effort.

The methods, apparatuses, devices and storage media for setting a time for a tick interrupt provided by the present disclosure are described in detail above. The principles and manners of implementations of the present disclosure are described using specific examples. The description of the above embodiments is merely used for facilitating the understanding of the present disclosure and its core idea. Furthermore, for those skilled in the art, there could be changes in the specific embodiments and application scopes according to the ideas of the present disclosure. In summary, the content of the present specification should not be construed as limitations to the present disclosure.

The present disclosure can be further understood using the following clauses.

Clause 1: A tick interrupt time setting method comprising: performing a compensation for a system time when a tick interrupt is executed; setting a time for a next tick interrupt according to a timeout task and a compensated system time if the timeout task exists when the tick interrupt is executed; and correcting, when a system enters into a low power mode after the tick interrupt is executed, the time for the next tick interrupt according to the timeout task that is updated when the low power mode is entered.

Clause 2: The method of Clause 1, wherein setting the time for the next tick interrupt according to the timeout task and the compensated system time if the timeout task exists when the tick interrupt is executed comprises: obtaining a shortest timeout time from timeout task(s) if the timeout task(s) exist(s) when the tick interrupt is executed; determining an interval time between a corresponding system time after the shortest timeout period has elapsed and the compensated system time; and setting the time for the next tick interrupt according to the interval time.

Clause 3: The method of Clause 2, wherein setting the time for the next tick interrupt according to the interval time comprises: determining whether the interval time is greater than a time threshold; setting the time for the next tick interrupt to be the time threshold if the interval time is greater than or equal to the time threshold; and setting the time for the next tick interrupt to be the interval time if the timeout period is less than the time threshold.

Clause 4: The method of Clause 2, wherein determining the interval time between the corresponding system time after the shortest timeout period has elapsed and the compensated system time comprises: obtaining a system timeout time corresponding to the system time according to the shortest timeout period; and subtracting the system timeout time by the compensated system time to obtain the interval time.

Clause 5: The method of Clause 3, wherein a count address corresponding to the time threshold is not greater than a total count address of a clock source counter.

Clause 6: The method of Clause 3, further comprising: setting a time for a first tick interrupt to be the time threshold when the system is initialized.

Clause 7: The method of Clause 1, wherein correcting, when the system enters into the low power mode after the tick interrupt is executed, the time for the next tick interrupt according to the timeout task that is updated when the low power mode is entered, comprises: correcting, when the system enters into the low power mode after the tick interrupt is executed and when a new timeout task exists and a corresponding timeout period is shorter than the shortest time of original timeout tasks, the time for the next tick interrupt according to the shortest time of the new timeout task; and maintaining the time for the next tick interrupt when a new timeout task exists and a corresponding timeout period is not shorter than the shortest time of original timeout tasks, or when no new timeout task exists.

Clause 8: The method of Clause 1, wherein performing the compensation for the system time when the tick interrupt is executed comprises: obtaining a number of sleep ticks of a tick counter for the system time during a previous sleep, and a count value of a clock source counter that has elapsed from a previous sleep time to a current time; and converting the count value of the clock source counter to a number of compensation ticks and adding the number of sleep ticks to the number of compensation ticks to obtain a number of ticks for the current system time.

Clause 9: The method of Clause 1, further comprising: setting the time for the next tick interrupt to be the time threshold if no timeout task exists when the tick interrupt is executed.

Clause 10: A tick interrupt time setting method comprising: performing a compensation for a system time when a tick interrupt is executed; and setting a time for a next tick interrupt according to a timeout task and a compensated system time is the timeout task exists when the tick interrupt is executed.

Clause 11: A tick interrupt time setting apparatus comprising: a compensation module configured to perform a compensation for a system time when a tick interrupt is executed; a first interrupt setting module configured to set a time for a next tick interrupt according to a timeout task and a compensated system time if the timeout task exists when the tick interrupt is executed; and an interrupt correction module configured to correct, when a system enters into a low power mode after the tick interrupt is executed, the time for the next tick interrupt according to the timeout task that is updated when the low power mode is entered.

Clause 12: The apparatus of Clause 11, wherein the first interrupt setting module comprises: a timeout period acquisition sub-module configured to obtain a shortest timeout period from among timeout task(s) if the timeout task(s) exist(s) when the tick interrupt is executed; an interval determination sub-module configured to determine an interval time between a corresponding system time after the shortest timeout period has elapsed and the compensated system time; and a setting sub-module configured to set the time for the next tick interrupt according to the interval time.

Clause 13: The apparatus of Clause 12, wherein the setting sub-module comprises: a threshold determination unit configured to determine whether the interval time is greater than a time threshold; a first setting unit configured to set the time for the next tick interrupt to be the time threshold if the interval time is greater than or equal to the time threshold; and a second setting unit configured to set the time for the next tick interrupt to be the interval time if the timeout period is less than the time threshold.

Clause 14: The apparatus of Clause 12, wherein the interval determination sub-module comprises: a conversion unit configured to obtain a system timeout time corresponding to the system time according to the shortest timeout period; and an interval acquisition unit configured to subtract the system timeout time by the compensated system time to obtain the interval time.

Clause 15: The apparatus of Clause 13, wherein a count address corresponding to the time threshold is not greater than a total count address of a clock source counter.

Clause 16: The apparatus of Clause 13, further comprising: an initial setting module configured to set a time for a first tick interrupt as the time threshold when the system is initialized.

Clause 17: The apparatus of Clause 11, wherein the interrupt correction module comprises: a correction sub-module configured to correct, when the system enters into the low power mode after the tick interrupt is executed and when a new timeout task exists and a corresponding timeout period is shorter than the shortest time of original timeout tasks, the time for the next tick interrupt according to the shortest time of the new timeout task; and a maintenance sub-module configured to maintain the time for the next tick interrupt when a new timeout task exists and a corresponding timeout period is not shorter than the shortest time of original timeout tasks, or when no new timeout task exists.

Clause 18: The apparatus of Clause 11, wherein the compensation module comprises: a timing acquisition sub-module configured to obtain a number of sleep ticks of a tick counter for the system time during a previous sleep, and a count value of a clock source counter that has elapsed from a previous sleep time to a current time; and a compensation sub-module configured to convert the count value of the clock source counter to a number of compensation ticks and adding the number of sleep ticks to the number of compensation ticks to obtain a number of ticks for the current system time.

Clause 19: The apparatus of Clause 11, further comprising: a second interrupt setting module configured to set the time for the next tick interrupt as the time threshold if no timeout task exists when the tick interrupt is executed.

Clause 20: A tick interrupt time setting apparatus comprising: a compensation module configured to perform a compensation for a system time when a tick interrupt is executed; and a first interrupt setting module configured to set a time for a next tick interrupt according to a timeout task and a compensated system time is the timeout task exists when the tick interrupt is executed.

Clause 21: A processing device comprising: one or more processors; and one or more computer readable media storing instructions that, when executed by the one or more processors, cause the device to perform one or more methods of Clauses 1-10.

Clause 22: One or more computer readable media storing instructions that, when executed by one or more processors, cause a device to perform one or more methods of Clauses 1-10.

The invention claimed is:

1. A method implemented by one or more computing devices, the method comprising:
   performing a compensation for a system time when a tick interrupt is executed;
   setting a time for a next tick interrupt according to a timeout task and a compensated system time if the timeout task exists when the tick interrupt is executed; and
   correcting, when a system enters into a low power mode after the tick interrupt is executed, the time for the next tick interrupt according to the timeout task that is updated when the low power mode is entered.

2. The method of claim 1, wherein setting the time for the next tick interrupt according to the timeout task and the compensated system time if the timeout task exists when the tick interrupt is executed comprises:
   obtaining a shortest timeout time from timeout task(s) if the timeout task(s) exist(s) when the tick interrupt is executed;
   determining an interval time between a corresponding system time after the shortest timeout period has elapsed and the compensated system time; and
   setting the time for the next tick interrupt according to the interval time.

3. The method of claim 2, wherein setting the time for the next tick interrupt according to the interval time comprises:
   determining whether the interval time is greater than a time threshold;
   setting the time for the next tick interrupt to be the time threshold if the interval time is greater than or equal to the time threshold; and
   setting the time for the next tick interrupt to be the interval time if the timeout period is less than the time threshold.

4. The method of claim 2, wherein determining the interval time between the corresponding system time after the shortest timeout period has elapsed and the compensated system time comprises:
   obtaining a system timeout time corresponding to the system time according to the shortest timeout period; and
   subtracting the system timeout time by the compensated system time to obtain the interval time.

5. The method of claim 3, wherein a count address corresponding to the time threshold is not greater than a total count address of a clock source counter.

6. The method of claim 3, further comprising:
   setting a time for a first tick interrupt to be the time threshold when the system is initialized.

7. The method of claim 1, wherein correcting, when the system enters into the low power mode after the tick interrupt is executed, the time for the next tick interrupt according to the timeout task that is updated when the low power mode is entered, comprises:
  correcting, when the system enters into the low power mode after the tick interrupt is executed and when a new timeout task exists and a corresponding timeout period is shorter than the shortest time of original timeout tasks, the time for the next tick interrupt according to the shortest time of the new timeout task; and
  maintaining the time for the next tick interrupt when a new timeout task exists and a corresponding timeout period is not shorter than the shortest time of original timeout tasks, or when no new timeout task exists.

8. The method of claim 1, wherein performing the compensation for the system time when the tick interrupt is executed comprises:
  obtaining a number of sleep ticks of a tick counter for the system time during a previous sleep, and a count value of a clock source counter that has elapsed from a previous sleep time to a current time; and
  converting the count value of the clock source counter to a number of compensation ticks and adding the number of sleep ticks to the number of compensation ticks to obtain a number of ticks for the current system time.

9. The method of claim 1, further comprising:
  setting the time for the next tick interrupt to be the time threshold if no timeout task exists when the tick interrupt is executed.

10. An apparatus comprising:
  one or more processors;
  memory;
  a compensation module stored in the memory and executable by the one or more processors to perform a compensation for a system time when a tick interrupt is executed;
  a first interrupt setting module stored in the memory and executable by the one or more processors to set a time for a next tick interrupt according to a timeout task and a compensated system time if the timeout task exists when the tick interrupt is executed; and
  an interrupt correction module stored in the memory and executable by the one or more processors to correct, when a system enters into a low power mode after the tick interrupt is executed, the time for the next tick interrupt according to the timeout task that is updated when the low power mode is entered.

11. The apparatus of claim 10, wherein the first interrupt setting module comprises:
  a timeout period acquisition sub-module configured to obtain a shortest timeout period from among timeout task(s) if the timeout task(s) exist(s) when the tick interrupt is executed;
  an interval determination sub-module configured to determine an interval time between a corresponding system time after the shortest timeout period has elapsed and the compensated system time; and
  a setting sub-module configured to set the time for the next tick interrupt according to the interval time.

12. The apparatus of claim 11, wherein the setting sub-module comprises:
  a threshold determination unit configured to determine whether the interval time is greater than a time threshold;
  a first setting unit configured to set the time for the next tick interrupt to be the time threshold if the interval time is greater than or equal to the time threshold; and
  a second setting unit configured to set the time for the next tick interrupt to be the interval time if the timeout period is less than the time threshold.

13. The apparatus of claim 11, wherein the interval determination sub-module comprises:
  a conversion unit configured to obtain a system timeout time corresponding to the system time according to the shortest timeout period; and
  an interval acquisition unit configured to subtract the system timeout time by the compensated system time to obtain the interval time.

14. The apparatus of claim 12, wherein a count address corresponding to the time threshold is not greater than a total count address of a clock source counter.

15. The apparatus of claim 12, further comprising:
  an initial setting module configured to set a time for a first tick interrupt as the time threshold when the system is initialized.

16. The apparatus of claim 10, wherein the interrupt correction module comprises:
  a correction sub-module configured to correct, when the system enters into the low power mode after the tick interrupt is executed and when a new timeout task exists and a corresponding timeout period is shorter than the shortest time of original timeout tasks, the time for the next tick interrupt according to the shortest time of the new timeout task; and
  a maintenance sub-module configured to maintain the time for the next tick interrupt when a new timeout task exists and a corresponding timeout period is not shorter than the shortest time of original timeout tasks, or when no new timeout task exists.

17. The apparatus of claim 10, wherein the compensation module comprises:
  a timing acquisition sub-module configured to obtain a number of sleep ticks of a tick counter for the system time during a previous sleep, and a count value of a clock source counter that has elapsed from a previous sleep time to a current time; and
  a compensation sub-module configured to convert the count value of the clock source counter to a number of compensation ticks and adding the number of sleep ticks to the number of compensation ticks to obtain a number of ticks for the current system time.

18. The apparatus of claim 10, further comprising:
  a second interrupt setting module configured to set the time for the next tick interrupt as the time threshold if no timeout task exists when the tick interrupt is executed.

19. One or more processor-readable media storing executable instructions that, when executed by one or more processors, cause the one or more processors to perform acts comprising:
  performing a compensation for a system time when a tick interrupt is executed; and
  setting a time for a next tick interrupt according to a timeout task and a compensated system time is the timeout task exists when the tick interrupt is executed; and
  correcting, when a system enters into a low power mode after the tick interrupt is executed, the time for the next tick interrupt according to the timeout task that is updated when the low power mode is entered.

* * * * *